Sept. 26, 1950     B. B. HOLMES     2,523,906
PRESSURE BREATHING OXYGEN REGULATOR
Filed Dec. 28, 1943     4 Sheets-Sheet 3

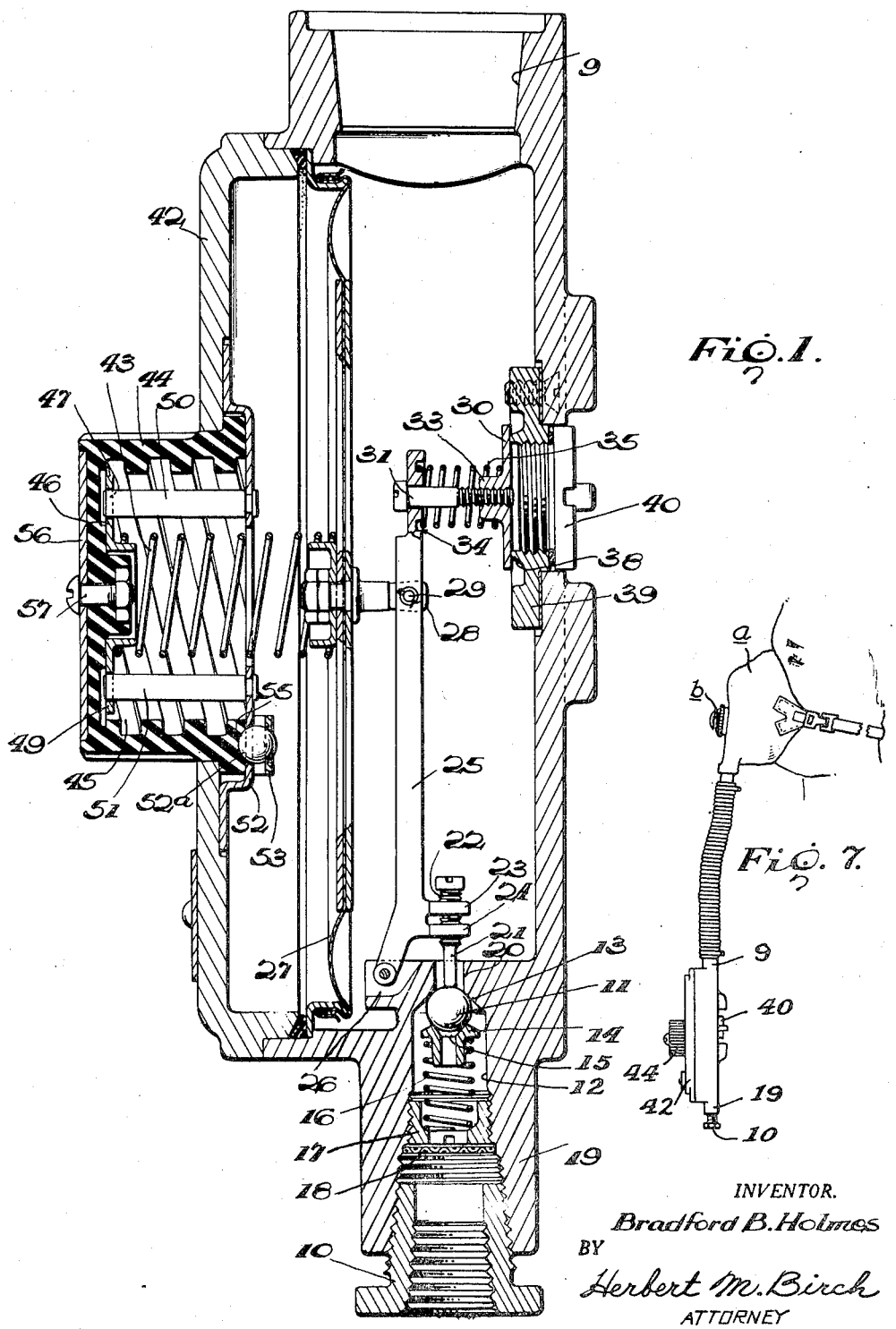

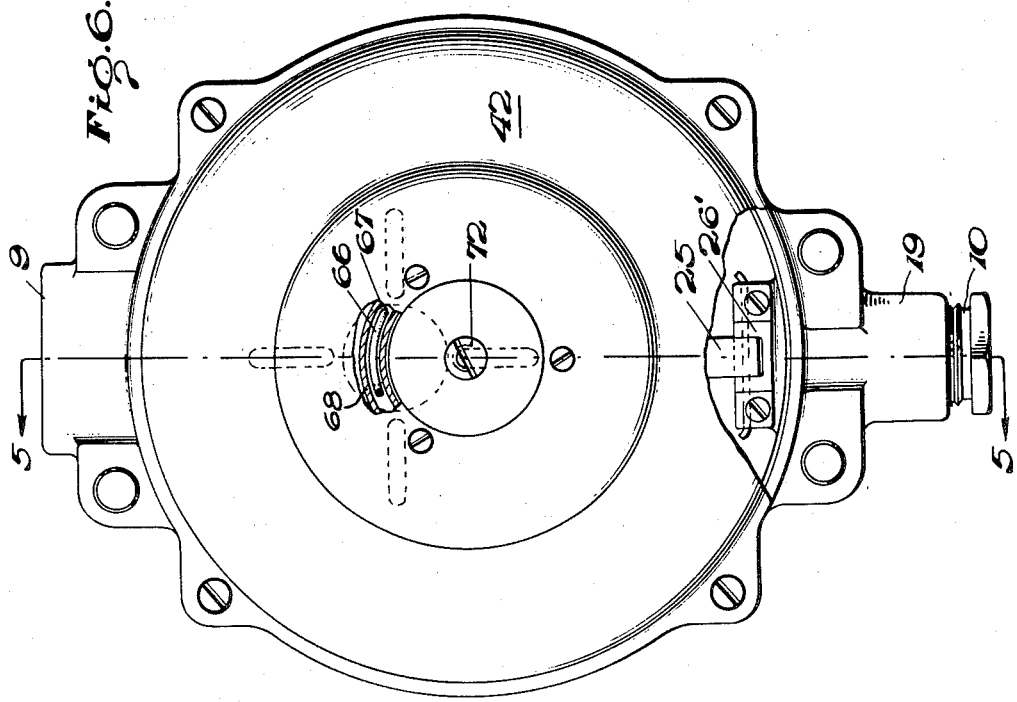
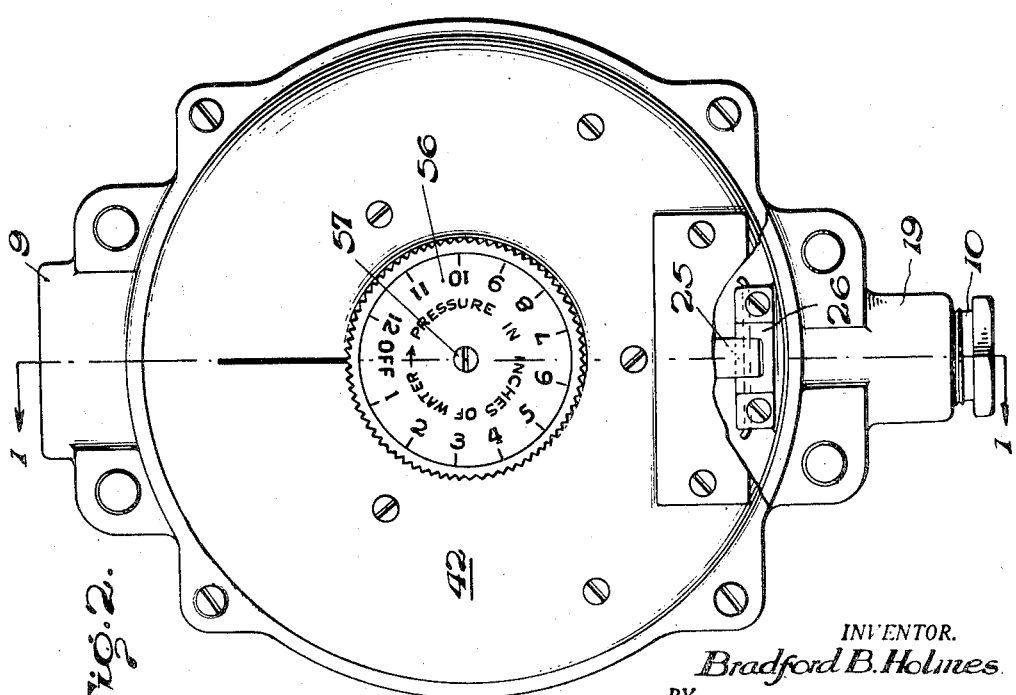

INVENTOR.
Bradford B. Holmes
BY
Herbert M. Birch
ATTORNEY

Patented Sept. 26, 1950

2,523,906

UNITED STATES PATENT OFFICE 2,523,906

PRESSURE BREATHING OXYGEN REGULATOR

Bradford B. Holmes, New York, N. Y., assignor to Bendix Aviation Corporation, Teterboro, N. J., a corporation of Delaware Application December 28, 1943, Serial No. 515,979

14 Claims. (Cl. 137—153)

This invention relates to oxygen regulators for high altitude flying and more particularly to improvements in such regulators.

For flying at high altitudes, oxygen is supplied to the lungs at a pressure substantially above atmospheric. This increases the partial pressure of oxygen in the lungs above what it would be if the pressure was atmospheric. It also expands the lungs and cells in the lungs so that a larger area is available for the absorption of oxygen. Provision of these factors greatly increase the altitude at which an aviator can ascend. For instance, with oxygen at atmospheric pressure, 42,000' is about the maximum altitude to which it is safe for an aviator to ascend breathing pure oxygen at ambient pressure. With a pressure of oxygen in the lungs equivalent to about 12" of water, ascents have been made in decompression chambers to 50,000'.

The apparatus used for this purpose, as known to those skilled in the art, consists of a portable oxygen regulator and a mask (not shown). The mask has a rubber lip or fringe adapted to be pressed against the face by gas pressure, and is, therefore gastight.

Heretofore, the system involved a demand regulator with a spring loaded diaphragm for building up the desired pressure, and a separated spring loaded exhaust valve in the respiratory mask or regulator. On inhaling, oxygen was supplied to the lungs by the spring loaded diaphragm and in exhaling increased pressure was built up which raised the diaphragm, stopping the flow of oxygen and opening the exhaust valve.

The disadvantage with this arrangement is that it is exceedingly difficult to balance or adjust the expiratory valve to the pressure caused by the spring loaded diaphragm. If the exhaust valve was adjusted too weakly, oxygen would blow out of the expiratory valve continuously. If adjusted too strong, the difference in pressure between exhaling and inhaling became excessive. As altitude is increased the gas pressure must be constantly increased, either by manual or aneroid adjustment of the spring pressure on the diaphragm, so that the expiratory valve must be constantly readjusted to conform with it.

One object of this invention is to provide novel means for adjustment of the action of the diaphragm, spring pressure thereon or extent of movement thereof and thus the pressures at which the device operates for altitude or barometric pressure, and for inhalation and exhalation pressures or the spread or difference between said latter pressures, and the adjustment and action of the expiratory or exhaust valve simultaneously with or independently of the inlet valve and in relation to the adjustment of the opening and closing movements of the inlet valve whereby the expiratory valve is at all times in proper adjustment with the diaphragm spring so that the difference between inhaling and exhaling pressures will operate the valves and be uniform and constant for any given condition.

Another object is to provide novel manual means for setting the pressure with great exactness.

Another object is to provide novel aneroid controlled means for automatically building up the pressure desired with altitude.

Another object is to provide novel means adapted to provide for testing the device or for converting the same for use with a mask containing the exhaust valve instead of the demand regualtor.

The above and other objects and advantages of the present invention will appear more fully hereinafter from a consideration of the detailed description which follows, taken together with the accompanying drawings wherein two embodiments of the invention are illustrated. It is to be expressly understood, however, that the drawings are for the purpose of illustration only and are not designed as a definition of the limits of the invention. Reference for this latter purpose should be had to the appended claims.

In the drawing, wherein like reference characters refer to like parts throughout the specification;

Figure 1 is a longitudinal cross section view of one embodiment of the present invention taken along the line 1—1 of Figure 2.

Figure 2 is a top elevational view of the embodiment of Figure 1 showing a regulator manual control knob.

Figure 6 is a top elevational view of the embodiment of Figure 5, showing the automatic aneroid evacuating means partly in cross section, and Figure 7 is an elevation showing the regulator used as a simple demand regulator applied to a mask having an expiratory valve.

Figure 3:
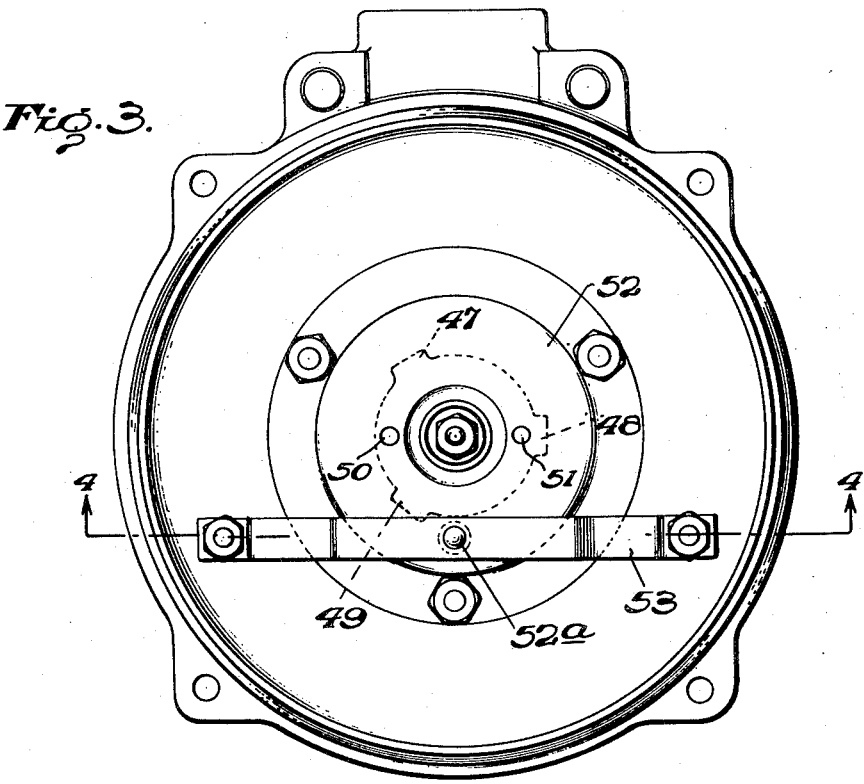
Figure 3 is a bottom elevational view of the inside of the regulator cover.

Referring in detail to the drawings and first with particular reference to Figure 1 showing the regulator body or casing forming a chamber, numeral 9 represents an outlet from the chamber to a mask, the pipe fitting 10 is connected to a source of oxygen supply, not shown, of about 30 to 40 pounds per square inch and the entrance of oxygen to the regulator is controlled by the metal ball or normally seated inlet valve 11. The ball or check valve 11 closes inwardly and opens outwardly.

The ball valve 11 movable in a bore or passage 12 is normally pressed against seat 13 by a hollow headed plug 14, which is countersunk to provide a seat 15 for the ball 11. Ball 11 is resiliently pressed against seat 13 by spring 16, which engages under the head of plug 14 and is adjustably seated at its other end in a countersunk exteriorly threaded bushing 17 threadedly adjustable therebeneath in the bore 12 in a threaded portion of the bore or passage 12 above or inwardly of and in alignment with fitting 10 and filter screen 18, within an enlarged apertured oxygen intake lug or tubular extension 19.

The intake lug 19 is drilled so as to define a relatively small inlet port 20 leading upwardly into the chamber of the regulator from seat 13, which is also defined therein. Though the port 20 extends an adjustable bolt or screw stem 21 threadedly adjustable through an internally threaded sleeve 22 threaded exteriorly and adjustably mounted in apertured lugs 23 and 24 projecting from diaphragm lever 25.

The diaphragm lever 25 is pivoted in an offset position at one end; i. e., its lower end in a bracket 26 extending at substantially right angles to the bore of port 20, so as to provide a bell-crank arrangement for actuation of the ball valve 11 through bolt 21, when diaphragm 27 moves lever 25 through split stud 28 and its transverse pivot pin 29.

Actuated by lever 25 at the other end thereof is an expiratory or exhaust valve 30, which is yieldably secured to the end of lever 25 by a bolt or screw stem 31, which is sealed in a hub-like part 33 of valve 30. The under side of lever 25 has an annular groove 34 defined therein, in which an end of a coil spring 35 is seated, while the other end of the spring rests on the outer face of valve 30 and engages around its hub-like part 33. Thus, the lever 25 is yieldably connected to the valve 30 in one direction or closing through the biasing or tension of spring 25 moving with the lever 25 which positively moves the valve 30 in the opposite direction with a slight lost-motion until said lever engages the head of the screw 31, to open the valve 30 by engaging against the head of the bolt or screw stem 31 and pressing thereon.

Thus, on inhaling, pressure in the regulator is reduced and the diaphragm 27 is moved or drawn in and depresses lever 25 through stud 28 and spring 35 in the direction of expiratory valve 30, so as to close it through the medium of the spring 35 which permits further movement of the lever 25 over the unthreaded portion of the screw 31 after valve 30 is seated against a seat 38 with the spring 35 being compressed, which lever action opens or unseats the ball valve 11 through bolt or screw stem 21, thereby allowing oxygen to flow into the regulator.

On exhaling, pressure rises in the regulator which presses on or reverses the movement of the diaphragm 27 and raises the lever 25 to retract or disengage the bolt or stem 21 from the ball valve 11, to thereby allow the spring 16 to close ball valve 11 against its seat 13 and thus the supply inlet and shut off the flow of oxygen. Further movement of lever 25 engaging the head of the bolt or screw stem 31 lifts expiratory valve 30 off its seat 38, defined in apertured plate 39, thereby allowing waste gas to escape or exhaust through the plate aperture. Thus, when inhaling, exhaust or expiratory valve 30 is closed and oxygen supply or inlet valve 11 is open, while on exhaling, valve 30 is opened after valve 11 is closed.

The expiratory valve 30 is shown plugged by exteriorly threaded test plug 40 adapted to thread in the threaded aperture defined in plate 39. Normally plug 40 is removed. It is supplied with the regulator because it is desirable to close off the valve for certain tests, and also so that the regulator can be used as a simple demand regulator with a mask $a$ having an expiratory valve $b$, as shown in Figure 7.

It will be seen that both the inlet and expiratory or exhaust valves 11 and 30, respectively, are controlled by the single lever 25 and diaphragm 27. Both are of hard material, such as metal, so a precise adjustment by bolt or screw 31 can be made so that the expiratory valve 30 opens immediately after the inlet valve 11 closes. This is important because the smaller the diaphragm movement the less difference there will be between inhaling and exhaling pressure. Screw 31 is adjusted so that about .010 to .015″ movement of the lever 25 after the ball 11 is seated on seat 132 will start to open the expiratory valve 30. The top of the regulator is closed by the cover 42 which contains a spring 43 and means for adjusting its length and hence the pressure applied to the diaphragm 27.

Figure 4:
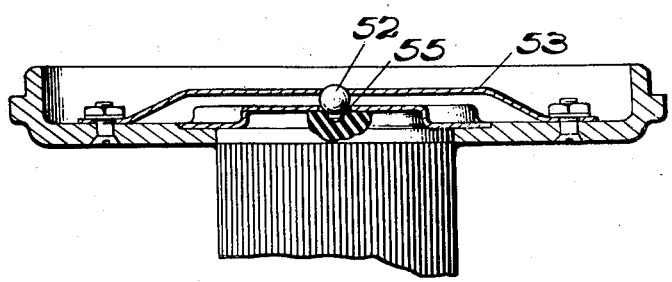
Figure 4 is a broken sectional view taken along the line 4—4 of Figure 3.

This diaphragm adjusting means comprises a hollow sleeve or knob 44 having an end wall at the outside, open at the inside and having an internal triple thread 45. The knob 44 forms a hollow annular member closed at the outer side or end and open at the inner side or end, and is mounted to turn in a central circular axial opening in the cover 42, the knob being inserted from the inside and having an outturned peripheral flange at its inner end abutting the inner face of the cover which prevents outward displacement of the knob while mounting the same to turn. A spider 46 has three projections 47, 48 and 49, see Fig. 3. which engage the thread 45. The spider 46 is prevented from turning by two or more guide pins 50 and 51 anchored to inner flanged apertured plate 52 secured to the inner face of the cover 42 over the flanged inner end of the knob 44 so that the latter is mounted to turn but is held against translation or endwise movement. Rotation of the knob 44 causes the spider 46 to move inward or outward on guide pins 50 and 51 thus changing the length of expanding or contracting the spring 43 positioned between diaphragm 27 and spider 46. A dog or latch means such as, ball 52a is pressed against the depressed seats or recesses in the inner end of sleeve or knob 44 through the aperture in plate 52 and a flat spring 53 under the action of flat spring 53 and provides a friction clutch or pawl to hold the knob 44 in any position. When the knob 44 is rotated, the ball 52a clicks into seats, holes or depressions 55, see Figure 4, provided at certain positions around the inner peripheral edge or face of the flange on the inner end of the knob 44, such as at points 4″, 8″, 12″ of water indicated on a dial 56. The dial 56, calibrated in inches of water cooperating with a fixed radial index line 56a on the cover 42 to indicate pressure corresponding to the pressure built up in the regulator by the spring 43, indicates the setting for any pressure. The dial 56 can be placed to conform to the adjustment of the individual regulator, and secured in position in knob 44 by screw of bolt 57.

In the position shown in the drawings, the spring 43 is at its free weight and thus does not build up any pressure. Under these conditions, the inhaling pressure would be about −.3 to −.4" water and the exhaling pressure about +.3 to +.4" water, or a "spread" of about .7".

When the spring 43 is compressed, say to a setting of 4", the exhaling pressure would be 4" and inhaling pressure about 3" and a spread of 1", but with increased pressure the spread will increase somewhat due to the stiffening of the spring 43.

It is obvious that the smaller the movement of diaphragm 27 and the more flexible the spring 43, the less will be the "spread." The flexibility of the spring 43 is a function of the operating movement in relation to its free height or length and this is limited in the design shown as it is not desirable to increase the overall height of the regulator above that absolutely necessary.

The operation of the manually controlled form depicted by Figures 1 through 4 may be briefly summarized by assuming that the regulator is suitably attached to the individual to be benefited, the usual mask strapped on and connected to mask outlet 9, and the inlet 10 connected to a suitable source of oxygen supply. Now upon inhaling a suction is created at the mask outlet 9 and pressure inside the regulator body is reduced, so that diaphragm 27 depresses lever 25 in the direction of valve 30 to thereby close the same and open valve 11 for an intake of oxygen into the regulator. On exhaling, pressure rises in the regulator and moves diaphragm 27, so as to raise lever 25 to close or permit closing of valve 11 without opening valve 30, due to the lost-motion connection of the lever 25 with valve 30 by reason of the interposed spring 35 and lever 25 being slidable on bolt or screw 31 away from and toward the shoulder or stop provided by a head thereof, and upon still further movement of the diaphragm 27 and lever 25, the latter engages the head of the screw 31 and moves the latter and the expiratory valve 30 opens to exhaust waste gas.

Adjustment of the regulator for inches of water according to altitude is accomplished by turning the knob 44 which carries the properly marked dial 56 with the desired adjustment calibration points on the latter aligning with the index line 56a and the knob adjustment is kept set for minimum deflection efficiency for best results.

Figure 5:
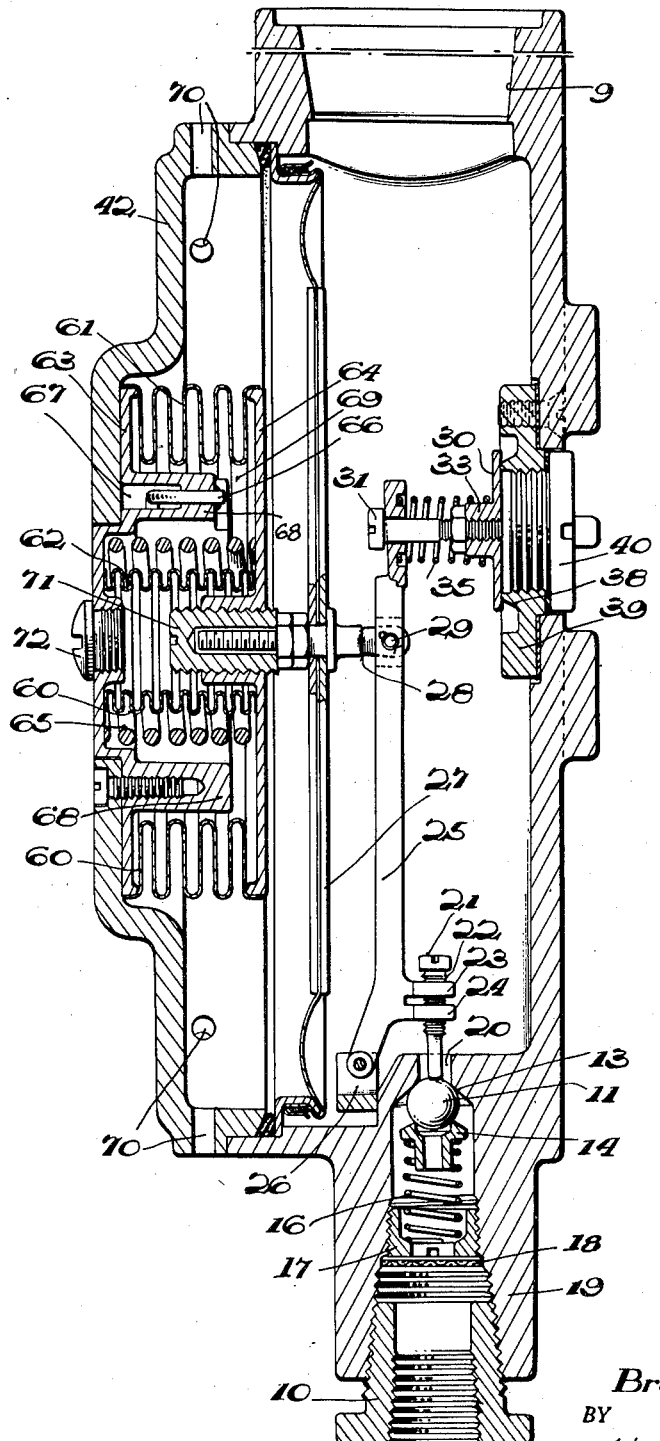
Figure 5 is a longitudinal cross section view of another embodiment of the present invention taken along the line 5—5 of Figure 6.

A further form is shown in Figures 5 and 6. In this form, the body of the regulator is the same but an aneroid control has been added in the cover. Accordingly, only the new parts of this form are given new reference numerals.

The latter arrangement provides two improvements over the first form shown in Figures 1, 2, 3 and 4. First and most important, it automatically adjusts the pressure with altitude. Secondly, the overall height of the instrument can be decreased.

Referring now in detail to Figures 5 and 6, the aneroid 60 consists of external bellows 61, internal bellows 62, top plate 63 secured to cover 42 and bottom plate 64 soldered to make an airtight chamber 69 and having an interiorly threaded central sleeve or hub in which an exteriorly threaded hollow screw 71 engages over a threaded shank of the stud 28. A spring 65 urges the plates 63 and 64 apart when an altitude is reached where the spring 65 becomes stronger than the atmospheric pressure on the area of the aneroid.

Cover 42 differs from that shown in the first embodiment, in that it is apertured at 70 to admit atmospheric pressure.

The aneroid 60 is evacuated through tube 66 which is then soldered closed and bent down into the pocket 67.

Under these conditions, at sea level and up to high altitudes, the aneroid 60 will be collapsed and the bottom plate 64 will press against the annular sleeve or stop 68 formed on the plate 63 and having an end wall or axially and radially inwardly extending annular flange at the outside to extend into a central opening in the cover 42, and open at the inside to permit spring 65 to be mounted in the aneroid chamber between the stop 68 and the internal bellows 62, and between said outer flange and plate 64 so as to act against the latter.

The forces acting on the aneroid are the spring 65 (including stiffness of bellows) tending to expand the aneroid 60 and $Pa$ (atmospheric pressure) $\times A$ (effective area of the aneroid), tending to collapse the aneroid 60.

It is customary to require that the spring 65 start to apply pressure at a certain altitude, say between 37,000' and 38,000' and that at some higher altitude say 46,000' the pressure shall be 8" of water.

Under the first condition, the aneroid must be clear from its stop 68 so that it is operative and must just start to move or contact the diaphragm 27. An adjusting screw 71 threaded through the hub of the plate 64 at the center and engaging over the threaded stem of stud 28 and operatively connects spring 65 to diaphragm 27 provides for this adjustment. The connection of the spring 65 with the diaphragm 27 consists of the stud 28 to aneroid 60 at the internally threaded hub or sleeve of the bottom or inner plate 64 which receives the screw or nut 71 to adjustably connect the spring 65 to the diaphragm 27, to adjust the tension or pressure of the spring 65 on the diaphragm 27 according to altitude or pressure in inches of water, or relative proximity of the plate 64 to the spring 65 and extent of movement of the diaphragm, or spread between inhalation and exhalation pressures. Under these conditions, the aneroid is in a state of equilibrium and $S=PaA$, where $S$=spring pressure, $Pa$ (atmospheric pressure) and $A$=(altitude).

At 46,000', the position of the aneroid has not been changed because the diaphragm is supported by the 8" of water pressure in the system, and the conditions can be stated by the formula $S-PaA=F$ when F is the force exerted by the diaphragm under the pressure built up.

Only one value of S and A will satisfy both conditions, but the initial start and pressure at a given altitude can be altered by the adjustment of screw 71. Since plate 63 is anchored to cover 42, plate 64 moves against the tension of the spring 65 under atmospheric pressure in expanding and collapsing or contracting of the aneroid, and since spring 65 acts on the plate 64, it is also operatively connected to the diaphragm 27 to operate the lever 25 and inlet and exhaust valves 11 and 30, by the adjustable threaded connection of the plate 64 at its axially outwardly extending annular hub or flange with screw 71 and engagement or operative connection of the latter with the diaphragm 27 through the stud 28 or clamping means mounting the latter on the diaphragm 27.

With a suitable size aneroid 60 and spring 65 as shown, the aneroid would be bottomed up to about 36,500'. At about 38,000' it would be in the position shown and just beginning to contact or move the aneroid 60 by engagement with the plate 64 and thus the diaphragm 27. With increase of altitude, the pressure would rise to 8" at 46,000' and about 11" at 50,000'.

Another important feature is the adjustment of the aneroid 60 at altitude. It is for this reason that the small bellows 62 is used to form the airtight annular chamber 69 to provide a central opening within the internal or inner bellows 62 so that a screw driver can be inserted from the outside, after removal of cap or plug 72, for turning adjusting screw 71 and adjusting spring 65 and the aneroid bellows 61 and 62 at the plate 64. For such adjustment the regulator is placed in a bell jar which has a screw driver coming through a stuffing box above the regulator.

The outlet 9 of the regulator is connected to a source of compressed air and a small flow corresponding to normal breathing turned on. This builds up a pressure in the regulator corresponding to exhaling and is measured on a water manometer. The bell jar is then evacuated to 46,000' and the screw 71 set to give 8" pressure in the manometer.

In operation, this form is substantially the same including the manual adjustment, the only distinction residing in the automatic control from the aneroid 60 in addition to the manual adjustment by means of the screw 71 in place of the manual control arrangement of Figures 1 through 4 for automatic action once the same is set or adjusted to the pressure spread or range and tension of the spring 43 on diaphragm 27 by the operative connection of the rotatable member or knob 44 with the diaphragm 27 through the spring or resilient biasing member 43 and held as described, corresponding to the adjustment and action of the aneroid 60 when set by the adjustment of the tension of the spring 65 by turning the screw 71.

There is thus provided a novel regulator for high altitude flying having a constantly proper adjustment at varying altitudes, so that the difference at all altitudes between inhaling and exhaling pressure will be uniform and constant for any given condition. Also, the present invention provides novel means for either manually or automatically setting the pressures to be built up in the regulator with varying altitudes. Also, it is obvious that the device may be used for diving.

Although the present invention is only described and illustrated in detail for two embodiments thereof, it is to be expressly understood that the same is not limited thereto. Various changes may be made in design and arrangement of the embodiments illustrated, as will now be apparent to those skilled in the art. For a definition of the limits of the invention, reference should be had to the appended claims.

I claim:

1. In a demand-type regulator having an oxygen inlet, a normally inwardly closed outwardly opening check valve means in said inlet, a diaphragm responsive to respiration, a normally outwardly closed inwardly opening exhaust valve, and means operatively associated with said check valve, said diaphragm and said exhaust valve adapted to move toward and independently of said exhaust valve, whereby said check valve is unseated outwardly and opened by displacement of said diaphragm responsive to inhaling when said exhaust valve is closed, and whereby said diaphragm moves away from and independently of said exhaust valve in response to exhalation and simultaneously moves said means associated with said diaphragm away from said check valve and further away from said exhaust valve so that said check valve closes and said exhaust valve is opened subsequent to the closing of said check valve.

2. In a demand-type regulator, a casing having an oxygen inlet with an outwardly facing seat and on exhaust outlet, check valve means in said inlet having means normally closing the same against said seat, a diaphragm responsive to respiration, an inwardly opening exhaust valve for said outlet, means operatively associated with said check valve, said diaphragm and said exhaust valve and partly movable relative to said check and exhaust valves, whereby said check valve is opened by unseating the same outwardly against said closing means upon displacement of said diaphragm and said operatively associated means responsive to inhaling toward said exhaust valve after the latter is closed, and whereby said diaphragm moves away from said exhaust valve in response to exhalation and moves said means associated with said diaphragm independently of and away from said check and exhaust valves while said exhaust valve remains closed so that said check valve closes and said exhaust valve is opened subsequent to the closing of said check valve, and means associated with said diaphragm adapted to adjust the extent of said diaphragm's deflection.

3. In a demand-type regulator having an oxygen inlet, spring seated inwardly closing valve means in said inlet, a diaphragm responsive to respiration, an exhaust valve, means operatively associated with said valve means, said diaphragm and said exhaust valve, whereby said valve means is opened by positive engagement of the operatively associated means therewith and unseating thereof by displacement of said diaphragm responsive to inhaling toward said exhaust valve, which is closed, and whereby said diaphragm moves away from said exhaust valve in response to exhalation to thereby open the same and move said means associated with said diaphragm so that said valve means closes and said exhaust valve opens subsequent to the closing of said valve means, means yieldably connected to and acting on said diaphragm, comprising a hollow control knob, a plurality of guide means in said knob adapted to guide said yieldably connected means, and means in the inner wall of said knob adapted to displace said yieldably connected means toward or away from said diaphragm to vary the resistance of said yieldable connection.

4. In a demand-type regulator having an oxygen inlet, valve means in said inlet, a diaphragm responsive to respiration, an exhaust valve, means operatively associated with said valve means, said diaphragm and said exhaust valve, whereby said valve means is opened by displacement of said diaphragm responsive to inhaling toward said exhaust valve, which is closed, and whereby said diaphragm moves away from said exhaust valve in response to exhalation to thereby open the same and move said means associated with said diaphragm so that said valve means closes and said exhaust valve opens subsequent to the closing of said valve means, means yieldably connected to said diaphragm, comprising a hollow control knob, a plurality of guide means in said knob adapted to guide said yieldably connected means, means in the inner wall of said knob adapted to displace said yieldably connected means toward or away from said diaphragm to vary the resistance of said yieldable connection, and means associated with said knob adapted to retain the same in its adjusted position.

5. In a demand-type regulator having an oxygen inlet, inwardly seating valve means in said inlet, pressure responsive means, an inwardly opening exhaust valve, means connected to said pressure responsive means having an adjustable member adapted to engage and move the inlet valve to unseat the same and move away from said inlet valve when seated, and resiliently and slidably connected to the exhaust valve adapted to alternately open and close said inlet valve means and said exhaust valve, and manually adjustable yieldable means adapted to control the extent of operation of said responsive means according to conditions of altitude or adjust the movement of the responsive means for difference between inhalation and exhalation pressures.

6. In a demand-type regulator including a housing having an outwardly facing seat, an oxygen inlet valve normally closing against said seat, an exhaust outlet, and an exhaust valve normally closing said outlet, a diaphragm in said housing, a lever adapted to be actuated by said diaphragm, means carried by said lever adapted to engage and open said oxygen inlet valve in one direction and move away from the same in the opposite direction, compensating means carried by said lever between the same and exhaust valve adapted to close said exhaust outlet valve when said oxygen inlet valve is open, said latter means adapted to move independently of the exhaust valve to a limited extent in either direction and to rigidly connect with the exhaust valve to open the same after the inlet valve is closed, and means adapted to control the actuation of said diaphragm to thereby regulate the extent of opening and closing of said respective valves.

7. In an oxygen regulator responsive to respiration; a valve control system, a diaphragm, an oxygen inlet valve normally closed in one direction and adapted to unseat in the opposite direction and an expiratory valve associated therewith; said valve control system comprising a lever, a bell-crank connection at an end of said lever having an adjustable stem adjacent the pivot of the lever, said lever being connected to said diaphragm and said stem adapted to engage with said oxygen inlet valve to open said valve responsive to inhaling, means independent of said lever adapted to normally close said oxygen inlet valve, yieldable means associated with the other end of said lever adapted to close said expiratory valve, while said oxygen inlet valve is opening and permit further movement of the lever after the expiratory valve is closed, and means to rigidly connect the lever to the expiratory valve under action of said yieldable means for opening said expiratory valve after said inlet valve has been closed by its said closing means.

8. In a demand-type regulator having an oxygen inlet, valve means in said inlet, a diaphragm responsive to respiration; an exhaust valve, means connected to said diaphragm adapted to alternately open and close said inlet valve means and said exhaust valve, and automatically adjustable yieldable means adapted to control the extent of diaphragm deflection according to conditions of altitude.

9. In a respirator device with a chamber, a diaphragm in the chamber and a control therefor, comprising an inwardly opening exhaust valve and a normally closed outwardly opening inlet valve leading to the chamber at one side of the diaphragm, yieldable means, means yieldably coupled to said diaphragm by said first means, rotatable means adapted to vary the yieldable qualities of said first means by reciprocation of said second means toward or away from said diaphragm, and means carried by the chamber adapted to hold said rotatable means at predetermined points of its rotation.

10. In a respirator device including a housing, a cover for said housing, a diaphragm and a control for said diaphragm, comprising an annular shell mounted for rotation adjacent its rim in said cover, an annular flange mounted inside said cover extending over the peripheral rim of said shell, guide means extending upwardly from said flange into said shell, means adapted to reciprocate on said guide means within said shell upon rotation of the shell, and yieldable means interposed between said diaphragm and said means on said guide means.

11. In a respirator device including a housing, a cover for said housing, a diaphragm and a control for said diaphragm, comprising an annular shell mounted for rotation adjacent its rim in said cover, an annular flange mounted inside said cover extending over the peripheral rim of said shell, guide means extending upwardly from said flange into said shell, means adapted to reciprocate on said guide means within said shell upon rotation of the shell, yieldable means interposed between said diaphragm and said means on said guide means, and yieldably mounted dog means adapted to latch said shell in adjusted positions.

12. In a demand type regulator, the housing having an oxygen inlet with a normally closed valve and associated with a normally closed exhaust valve, a diaphragm in said housing, a simple lever pivotally connected between its ends to the diaphragm, adjustable means carried by said lever near its pivot adapted to open said oxygen inlet valve in one direction, means between the lever and exhaust valve resiliently closing the exhaust valve in response to inhalation within the housing until the inlet valve is closed, and permit automatic closing of the inlet valve in the opposite direction in response to exhalation and thereafter cause positive inward unseating of the exhaust valve, adjustable yielding means acting on the diaphragm and means for adjusting the yielding means according to altitude and the differential in inhalation and exhalation pressures for effecting opening of the inlet valve and closing of the exhaust valve at a predetermined pressure altitude or altitudes.

13. In an oxygen regulator responsive to respiration, a valve control system including a diaphragm, a normally seated oxygen inlet valve and an expiratory valve associated therewith, a lever pivoted at one end, an arm near the pivoted end of the lever adapted to unseat the inlet valve on inhaling, a resilient connection between the opposite end of the lever and the expiratory valve to close the latter when the inlet valve is unseated and to cause opening of the expiratory valve when the inlet valve is closed, and independent means associated with the diaphragm for regulating the action thereof according to inhalation and exhalation pressures.

14. In a demand regulator, a casing having an internal chamber with an inlet at one end and an outlet at the other end, an outwardly unseating normally seated spring ball valve in the inlet, an exhaust outlet at one side of the casing, an exhaust valve seating outwardly over said exhaust outlet, a diaphragm in the chamber responsive to respiration, means to yieldably hold the diaphragm inwardly, rotatable means in the casing opposite the exhaust outlet to adjust the tension of the spring, said means being movable toward and away from the diaphragm at one side, a lever pivoted at one end near the inlet and having an adjustable stem lengthwise of the lever at one side to engage and unseat the ball valve or permit seating thereof, a connection between the diaphragm and the lever spaced from the opposite end of the latter, and a resilient slidable connection between the adjacent end of the lever and the exhaust valve to permit the inlet valve to close before the exhaust valve is opened on exhalation in the chamber by movement of the diaphragm and lever away from the exhaust valve and to permit movement of the lever independently of the exhaust valve when closed to permit unseating of the ball valve under inhalation pressure within the chamber.

BRADFORD B. HOLMES.

REFERENCES CITED

The following references are of record in the file of this patent:

UNITED STATES PATENTS

| Number | Name | Date |
|---|---|---|
| 802,496 | Collin | Oct. 24, 1905 |
| 1,128,426 | Dunham | Feb. 16, 1915 |
| 1,131,490 | Drager | Mar. 9, 1915 |
| 1,525,426 | Mueller | Feb. 3, 1925 |
| 1,551,908 | Pronty | Sept. 1, 1925 |
| 1,926,069 | Sutton | Sept. 12, 1933 |
| 2,223,570 | McMillin | Dec. 3, 1940 |
| 2,268,172 | Sinnet | Dec. 30, 1941 |
| 2,269,904 | Erickson | Jan. 13, 1942 |
| 2,288,436 | Cahan | June 30, 1942 |
| 2,308,124 | Stettner | Jan. 12, 1943 |
| 2,310,022 | Heidbrink | Feb. 21, 1943 |
| 2,313,149 | Jacobsson | Mar. 9, 1943 |
| 2,378,047 | Strange | June 12, 1945 |

FOREIGN PATENTS

| Number | Country | Date |
|---|---|---|
| 4,605 | Great Britain | Feb. 29, 1908 |
| 26,114 | Sweden | Dec. 28, 1908 |
| 72,938 | Switzerland | July 17, 1916 |
| 439,183 | Great Britain | Dec. 2, 1935 |
| 463,492 | Great Britain | Apr. 1, 1937 |
| 609,942 | France | May 22, 1926 |
| 637,255 | France | Jan. 24, 1928 |